United States Patent
Hickert

(10) Patent No.: US 7,051,901 B2
(45) Date of Patent: May 30, 2006

(54) AIR BARRIER DEVICE FOR PROTECTING LIQUID FLUIDS IN OPENED CONTAINERS

(76) Inventor: Paul R. Hickert, 2840 W. Bay Dr., #286, Belleair Bluffs, FL (US) 33770

( * ) Notice: Subject to any disclaimer, the term of this patent is extended or adjusted under 35 U.S.C. 154(b) by 178 days.

(21) Appl. No.: 10/708,718

(22) Filed: Mar. 19, 2004

(65) Prior Publication Data

US 2004/0182888 A1 Sep. 23, 2004

Related U.S. Application Data

(60) Provisional application No. 60/320,020, filed on Mar. 19, 2003.

(51) Int. Cl.
G01F 11/00 (2006.01)
B05B 11/06 (2006.01)

(52) U.S. Cl. ................ 222/1; 222/633; 222/319; 222/386.5; 222/401; 222/481.5

(58) Field of Classification Search ............... 222/1, 222/153.09, 632, 633, 319, 386.5, 401, 402, 222/481.5
See application file for complete search history.

(56) References Cited

U.S. PATENT DOCUMENTS

| 262,773 | A | | 8/1882 | Hohl |
| 276,083 | A | | 4/1883 | Schunck |
| 447,974 | A | | 3/1891 | Rheinstrom |
| 534,541 | A | | 2/1895 | Wright et al. |
| 601,877 | A | | 4/1898 | Lochmann |
| 713,708 | A | | 11/1902 | Spire |
| 814,820 | A | * | 3/1906 | Wood .......................... 239/362 |
| 2,063,430 | A | | 12/1936 | Graser .......................... 225/11 |
| 2,673,013 | A | | 3/1954 | Hester ..................... 222/386.5 |
| 3,343,701 | A | | 9/1967 | Mahoney ..................... 215/52 |
| 4,142,657 | A | | 3/1979 | Wanke .................... 222/386.5 |
| 4,211,115 | A | | 7/1980 | Engebreth ................. 73/421 B |
| 4,392,578 | A | | 7/1983 | Fipp et al. .................... 215/231 |
| 4,432,463 | A | | 2/1984 | MacDonald et al. ...... 217/12 R |
| 4,473,174 | A | | 9/1984 | Heuser ....................... 222/152 |
| 4,475,576 | A | | 10/1984 | Simon ......................... 141/98 |
| 4,482,072 | A | | 11/1984 | Hankins ..................... 215/269 |
| 4,494,452 | A | | 1/1985 | Barzso ....................... 99/323.1 |
| 4,512,251 | A | | 4/1985 | Green .......................... 99/472 |
| 4,684,033 | A | | 8/1987 | Marcus ....................... 215/269 |
| 4,691,842 | A | | 9/1987 | Foures .......................... 222/1 |
| 4,809,884 | A | | 3/1989 | Stackhouse ................. 222/153 |
| 4,942,960 | A | | 7/1990 | Kawaguchi et al. ........ 206/205 |
| 5,114,033 | A | * | 5/1992 | Golias et al. ................. 222/82 |
| 5,887,752 | A | * | 3/1999 | Strother ......................... 222/1 |
| 5,976,583 | A | | 11/1999 | Mastrocola ..................... 426/7 |
| 6,053,366 | A | | 4/2000 | Legue ........................ 222/152 |
| 6,105,803 | A | | 8/2000 | Standish ...................... 220/80 |
| 6,220,311 | B1 | | 4/2001 | Litto ........................... 141/67 |
| 6,502,725 | B1 | | 1/2003 | Alexander ................ 222/185.1 |
| 2002/0000419 | A1 | | 1/2002 | Meuller ..................... 215/13.1 |
| 2002/0033346 | A1 | | 3/2002 | Liebmann, Jr. ........... 206/213.1 |
| 2002/0088827 | A1 | | 7/2002 | Colucci ...................... 222/386 |
| 2002/0117055 | A1 | | 8/2002 | Liebmann, Jr. ............. 99/277.1 |

* cited by examiner

Primary Examiner—Joseph A. Kaufman
(74) Attorney, Agent, or Firm—Ronald E. Smith; Smith & Hopen, P.A.

(57) ABSTRACT

A device inhibits oxidation of wine remaining in a bottle. A stopper and an inflatable bladder replace the cork. In a first embodiment, a wine duct formed in the stopper is open when the stopper is in an extended position and is closed when the stopper is retracted. Air displaces but does not contact the wine by filling the bladder through an air duct formed in the stopper. After decanting, air that seeps into the wine chamber is removed by forcing air into the bladder, using an external hand pump inserted into the air duct. When sufficient air is pumped into the bladder to raise the wine level to contact the stopper, the stopper is placed into its retracted position. In an additional embodiment, a valve controls opening and closing of the wine duct and the stopper has no extended and retracted position.

7 Claims, 20 Drawing Sheets

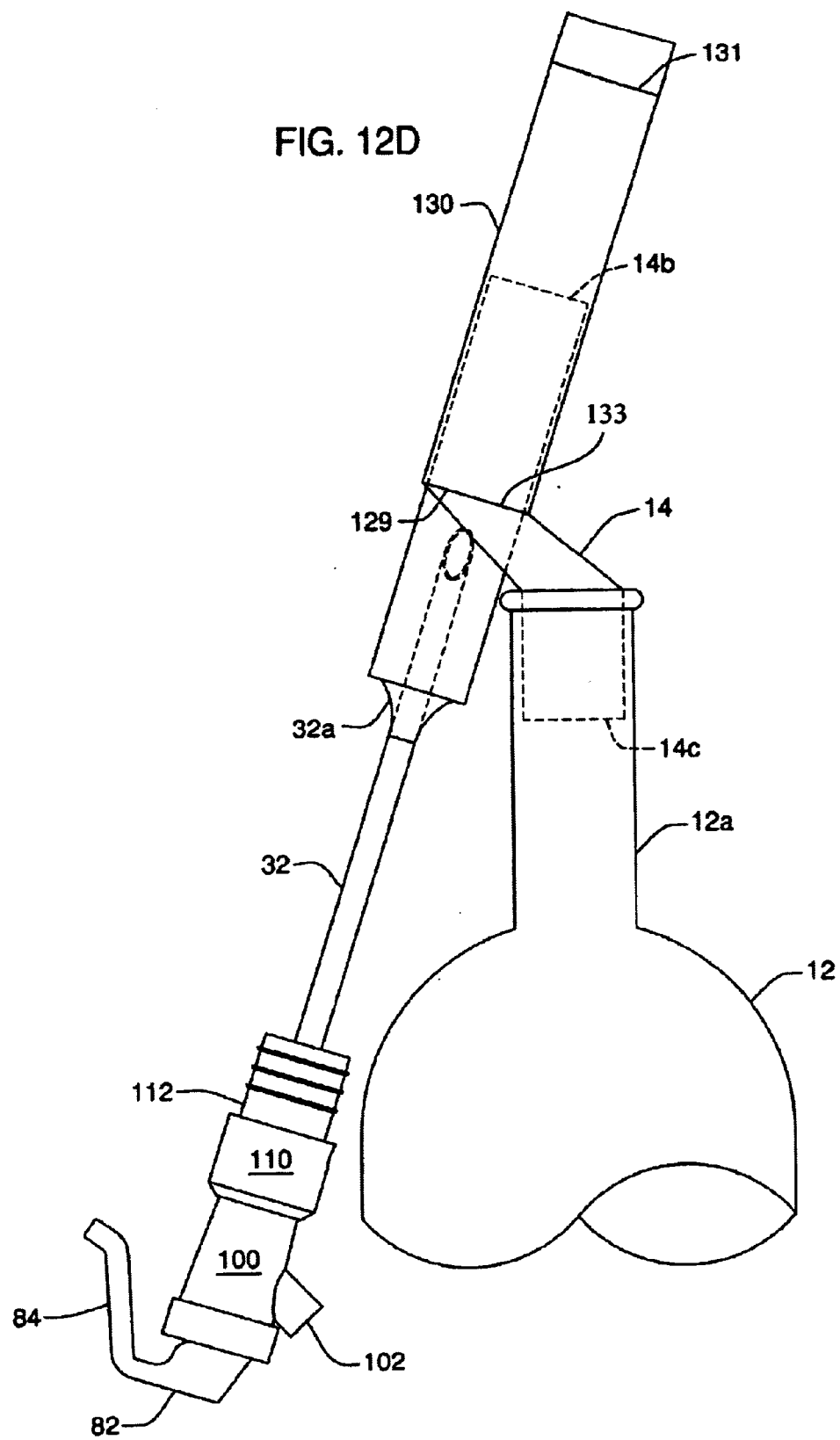

AIR BARRIER DEVICE FOR PROTECTING LIQUID FLUIDS IN OPENED CONTAINERS

CROSS-REFERENCE TO RELATED DISCLOSURE

This application claims priority of a provisional application entitled: "Device to Limit Wine Exposure to Air in Opened Wine Bottles," filed Mar. 19, 2003 by the present inventor and bearing application Ser. No. 60/320,020.

BACKGROUND OF THE INVENTION

1. Field of the Invention

This invention relates, generally, to the art of protecting wine and other liquid fluids from oxidation. More particularly, it relates to an apparatus that includes an inflatable bladder disposed within a bottle that displaces air from the bottle and provides an air-impermeable barrier that protects the contents of the bottle from the effects of oxidation.

2. Description of the Prior Art

Wine exposed to oxygen suffers a loss in quality of color, taste, and composition due to the process of oxidation. Excessive oxidation leads to spoilage and thus complete loss of the wine. Accordingly, several methods have been developed to prevent such oxidation during production and aging of quality wine.

Methods have also been developed to protect wine in a bottle from oxidation after the bottle has been opened.

One known method requires that the wine be frozen after the bottle has been opened. This technique prevents oxidation, but few customers are willing to wait for a bottle of wine to thaw out after it has been frozen.

Another method includes the steps of decanting the contents of the wine bottle into a container that is sized to exactly hold the wine poured into it, and to seal such container. The theory behind this method is that there will be little or no air between the wine and the seal for the container. However, this requires that a large supply of containers of varying sizes be kept on hand. Moreover, an exact match of container capacity and the volume of wine being decanted is seldom if ever achieved.

Still another method includes the steps of spraying an inert gas into the original wine bottle. The gas displaces the air from the bottle. Problems arise, however, when an effort is made to place a stopper in the bottle after the air has been supplanted by the inert gas. Specifically, some air will almost always be introduced into the bottle during the time required to remove the source of the gas from the mouth of the bottle and to install the stopper. Nor does this method provide a visual indication that the air in the bottle has actually been displaced.

A stopper and pump may also be employed to evacuate air from a bottle. This method reduces the amount of air in contact with the wine, but a perfect vacuum is unattainable. Thus, significant residual air remains in the space above the wine after the vacuuming operation has been completed.

Each of the known methods also exposes the wine to air every time the wine is dispensed.

What is needed, then, is an improved method for preventing or inhibiting oxidation that is not subject to the limitations of prior art methods.

However, in view of the prior art taken as a whole at the time the present invention was made, it was not obvious to those of ordinary skill how the identified need could be fulfilled.

SUMMARY OF INVENTION

The long-standing but heretofore unfulfilled need for a means for protecting bottled wine or other bottled liquid fluids from oxidation is now met by a new, useful, and non-obvious invention.

In a first embodiment, the novel device for dispensing wine from a wine bottle and for protecting unpoured wine from excessive oxidation by reducing ullage includes a stopper having a first, extended position relative to the neck of a wine bottle and a second, retracted position relative to said neck. Wine may be poured from the bottle when the stopper is in the extended position but not when the stopper is in the retracted position.

In this first embodiment, there are two bores formed in the stopper. The first bore provides an air duct. It has a relatively small diameter and extends from a top wall of the stopper to a bottom wall thereof. A mounting tube is positioned in the first bore such that a top end of the mounting tube extends slightly above the top wall of the stopper and a bottom end of the mounting tube extends slightly below the bottom wall of the stopper.

A pump or inflating means is thus easily attachable to the top end of the mounting tube and a disposable, inflatable bladder is attachable to the bottom end of the mounting tube. The lumen of the mounting tube is an air duct because it enables air to be pumped into the bladder. The bladder is positioned inside the wine chamber, i.e., the space inside the wine bottle. Thus, inflation of the bladder causes it to expand within the wine chamber, thereby displacing wine and thereby preventing oxygen from contacting the wine.

No mounting tube is employed in an alternative construction. The pump or inflating means has a neck that is inserted directly into the upper end of the air duct. A boss may be formed integrally with the lower end of the air duct to provide a mount for the neck of the air bladder. In another alternative embodiment, the mounting tube is connected to the bladder and the free end of the mounting tube is directly inserted into the lower end of the air duct.

The second bore has a ninety degree bend formed therein. More particularly, the second bore has a radially-extending part and a longitudinally-extending part. The radially-extending part has a radially outermost end in open communication with a sidewall of the stopper. A radially innermost end thereof is in open communication with the upper end of the longitudinally-extending part.

The second bore provides a wine duct. The air duct and the wine duct do not intersect one another, i.e., there is no fluid communication between said ducts.

If the stopper is in its retracted position, the radially-outermost end of the wine duct abuts the neck of the wine bottle and wine cannot be poured. If the stopper is in its extended position, wine flows through the longitudinally-extending part of the wine duct and through the radially-extending part thereof into a wine glass.

After such decanting, the stopper is pushed back into its retracted position and any suitable inflating means may be employed to inflate the bladder. As the bladder inflates, it displaces the wine in the wine chamber until the wine reaches the bottom of the stopper. This prevents oxygen from contacting the wine. The air duct is then plugged by any suitable means to prevent air in the bladder from flowing into the ambient environment.

In this first embodiment, the means for inflating the bladder includes a hand-held air pump having a flexible neck terminating in a fee end that is removably mountable to the top end of the mounting tube so that alternately squeezing and releasing the hand-held air pump causes air to flow through the flexible neck, through the mounting tube, and into the bladder. A squeeze bulb having a straight, relatively stiff neck may also be used where no mounting tube is employed. The neck is inserted directly into the upper end of the air duct as mentioned earlier.

In a second embodiment, the inflating means is a pump having a cylindrical main body, a plunger mounted for reciprocation with the main body, a handle secured to a trailing end of the plunger and an outlet nozzle in fluid communication with the top end of the mounting tube. Operation of the inflating means causes air to flow through the mounting tube into the bladder.

The outlet nozzle may be adapted to fit directly into the upper end of the air duct, thereby obviating any need for a mounting tube or a mounting boss at said upper end.

A third embodiment adds a restrictor that prevents inadvertent removal of the stopper from the wine bottle.

In a fourth embodiment, the air duct has a ninety degree (90°) bend formed therein so it does not extend from the top wall to the bottom wall of the stopper as in the first three embodiments. A first or radially-extending part of the air duct has an outermost end in open communication with a sidewall of the stopper. A second or longitudinally-extending part of the air duct has an upper end in open communication with the radially-innermost end of the first part. The lower end of the second part is in open communication with the bottom wall of the stopper.

A flexible mounting tube may be positioned within the air duct having the ninety degree (90°) bend so that a first end thereof extends slightly beyond the opening in the stopper side wall to provide a mount for an air pump and a lower end thereof extends slightly beyond the bottom wall of the stopper to provide a mount for the bladder.

However, no such flexible mounting tube having a ninety degree (90°) bend is needed if an air pump of the type having a relatively stiff neck is used and the neck is simply inserted into the radially-extending part of the air duct to inflate the bladder, and if a straight mounting tube is attached to the bladder so that the mounting tube is directly attachable to the lower end of the second, longitudinally-extending part of the air duct.

A wine duct is also formed in the fourth embodiment of the stopper. It has a diameter greater than that of the air duct and extends longitudinally from a top wall of the stopper to a bottom wall of the stopper.

A removable cap closes the upper end of the wine duct when the wine is in storage. To pour wine using this fourth embodiment, the cap is removed so that wine in the bottle may flow into a wine glass through the wine duct. When the pouring is completed, an inflating means is attached to the part of the mounting tube that extends from the radially extending part of the air duct, or no mounting tube is used and an inflating means is inserted directly into the radially-extending part of the duct. The bladder is inflated until the wine reaches the bottom of the stopper or the top of the wine duct at which time the cap is attached in closing relation to the upper end of the wine duct. The stopper is then pressed down into the neck so that the air duct is sealed.

In a fifth embodiment, a wine dispensing assembly includes a thumb-operated valve, a dispenser having a spout, and a stopper. The valve surmounts the dispenser and the dispenser surmounts the stopper. The valve is normally closed, i.e., it is closed when in its position of repose.

A wine duct formed in the stopper extends longitudinally from a top wall to a bottom wall of the stopper. The wine duct extends further from the top wall of the stopper into the dispenser and has a ninety degree (90°) bend formed therein in the dispenser so that it terminates in fluid communication with the spout.

An air duct also has a ninety degree (90°) bend formed therein but said air duct is formed wholly within the stopper as in the fourth embodiment. However, the stopper has only one position. Thus, there is no extended position for pouring and no retracted position for sealing. In this fifth embodiment, the radially outermost end of the air duct is in open communication with a side wall of the stopper and hence the ambient environment at all times.

As in all other embodiments, the wine duct and air duct are not in fluid communication with one another.

The stopper has a top part having a first diameter greater than an internal diameter of a neck of a wine bottle and a base having a second diameter that is reduced with respect to the top part so that said base may extend into the neck of the wine bottle.

Flexible and resilient sealing means are disposed in circumscribing relation to the base to prevent leakage of wine from the bottle when the base of the stopper is inserted into the neck of the bottle.

An internally threaded bore is formed in the top part of the stopper.

The dispenser that surmounts the stopper has a main body having a first diameter and a second, reduced diameter hollow part that is externally threaded for screw-threaded engagement with the internally threaded bore formed in the top part of the stopper.

The wine duct formed in the stopper extends longitudinally from a top wall of the stopper to a bottom wall of the stopper as mentioned above. The internal threads formed in the top part of the stopper are formed in an upper end of said wine duct.

A pour spout is formed integrally with the dispenser and extends radially outwardly from said dispenser in open fluid communication with the radially-extending part of the wine duct.

A mounting tube is attached to the bladder and the free uppermost end of said mounting tube is inserted directly into the lowermost end of the longitudinally-extending part of the air duct.

The valve that surmounts the dispenser is normally closed and said valve must be opened before wine or other fluid may be poured from the bottle. The valve must also be open when the bladder is being inflated after wine has been poured from the bottle.

This invention further includes a novel method for inserting an inflatable bladder into a bottle without touching the inflatable bladder. The novel method includes the steps of providing a stopper with a main body and a neck having a reduced diameter relative to the main body and forming an air duct and a wine duct in the main body and the neck. The mouth of the bladder is sealed to a mounting tube so that a first end of the mounting tube protrudes from the bladder and a second end of the mounting tube extends into the hollow interior of the bladder. The bladder is folded along a plurality of longitudinal folding lines that are parallel to one another and equidistantly spaced apart from one another to create an accordion fold so that a width of the bladder when accordion-folded is only slightly greater than a width of the mounting tube.

The bladder is also folded along a transverse folding line so that a bottom of the bladder is spaced slightly downwardly from a top of the bladder. The longitudinally and transverely folded bladder is removed from a wrapper by withdrawing the wrapper until the first end of the mounting tube protrudes from the wrapper. The stopper is positioned in an upright configuration and the first end of the mounting tube is inserted into the air duct while holding the wrapper. The wrapper and the stopper are inverted and the wrapper is withdrawn further until the bottom end of the bladder protrudes from the wrapper.

The bottom end of the bladder is inserted into a neck of a bottle while holding the wrapper. The wrapper is further withdrawn until the bladder is fully removed therefrom. The stopper is then returned to the upright position and the bladder is further inserted into the bottle until the bladder is fully received within the bottle.

The neck of the stopper is inserted into sealing relation to the neck of the bottle so that the stopper and bladder are fully inserted into the bottle without touching the bladder.

The primary advantage of the invention is that the bladder, when inflated, causes the level of liquid fluid within the bottle to rise until no air is left in the bottle. Another advantage is that, in the first three embodiments, it is a simple matter to configure the stopper for pouring by placing it into a first, extended position and to configure the stopper for storage by pushing it into a retracted position within the neck of the wine bottle.

An advantage of the fourth embodiment is that wine is easily dispensed upon removing the cap and protected from oxygen by attaching the cap.

An important advantage of the fifth embodiment is its integration of parts so that said fifth embodiment is easy to use.

Another major advantage of the fifth embodiment is that the stopper is not extended to enable pouring nor is it retracted to cut-off pouring.

A further advantage of the fifth embodiment is that a user may dispense wine in controlled amounts by the simple expedient of lifting a thumb from a handle to stop the flow of wine.

These and other advantages will become apparent as this disclosure proceeds. The invention includes the features of construction, arrangement of parts, and combination of elements set forth herein, and the scope of the invention is set forth in the claims appended hereto.

BRIEF DESCRIPTION OF DRAWINGS

For a fuller understanding of the nature and objects of the invention, reference should be made to the following detailed description, taken in connection with the accompanying drawings, in which:

FIG. 12D depicts how the novel structure is inverted so that the lower end of the bladder may be inserted into the wine chamber as the bladder is withdrawn from its wrapper.

DETAILED DESCRIPTION

Figure 1A:
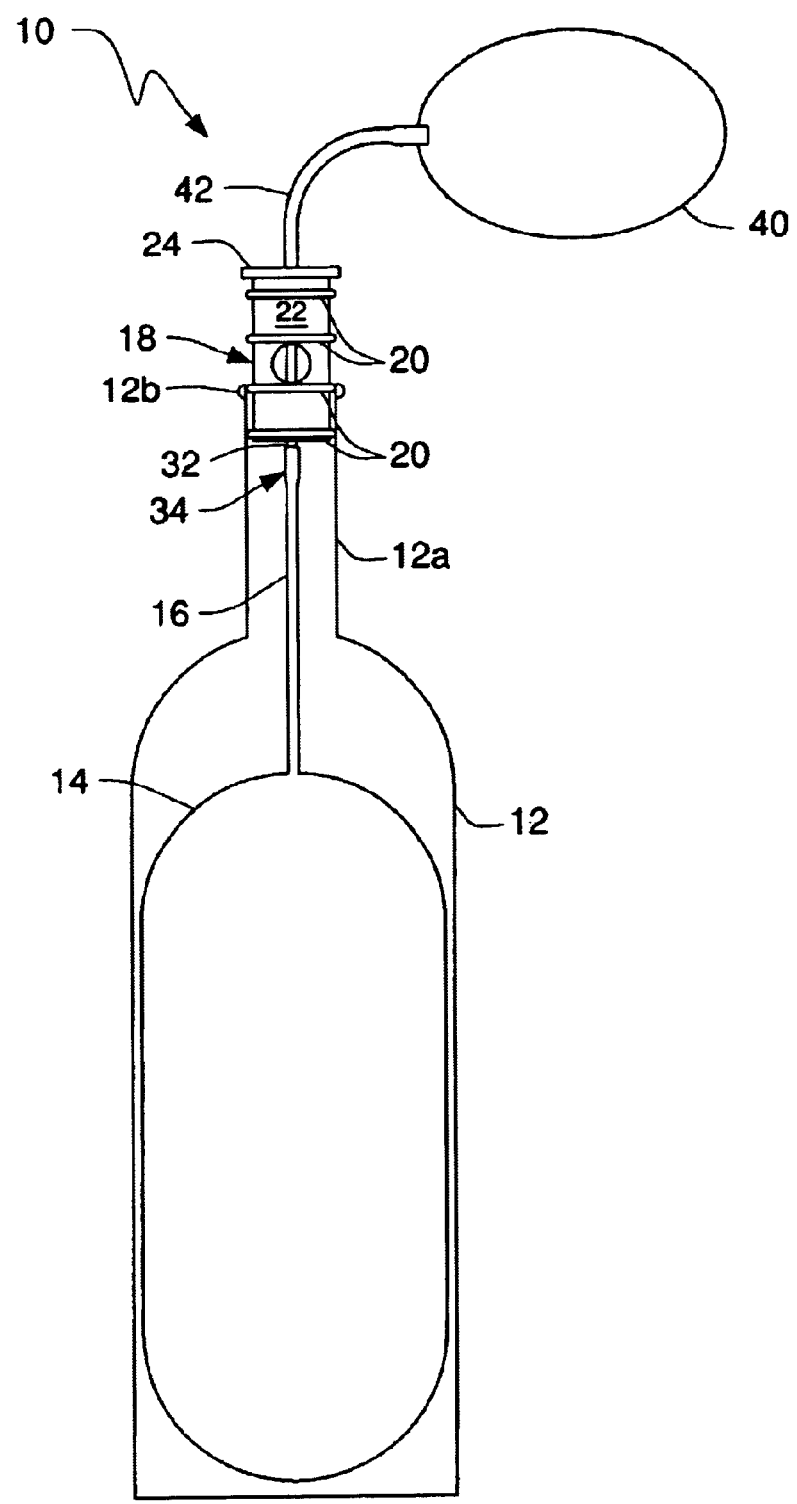
FIG. 1A is a side elevational view of a first embodiment of the novel stopper when inserted into the neck of a wine bottle in its open or "pour" configuration.
Figure 1B:
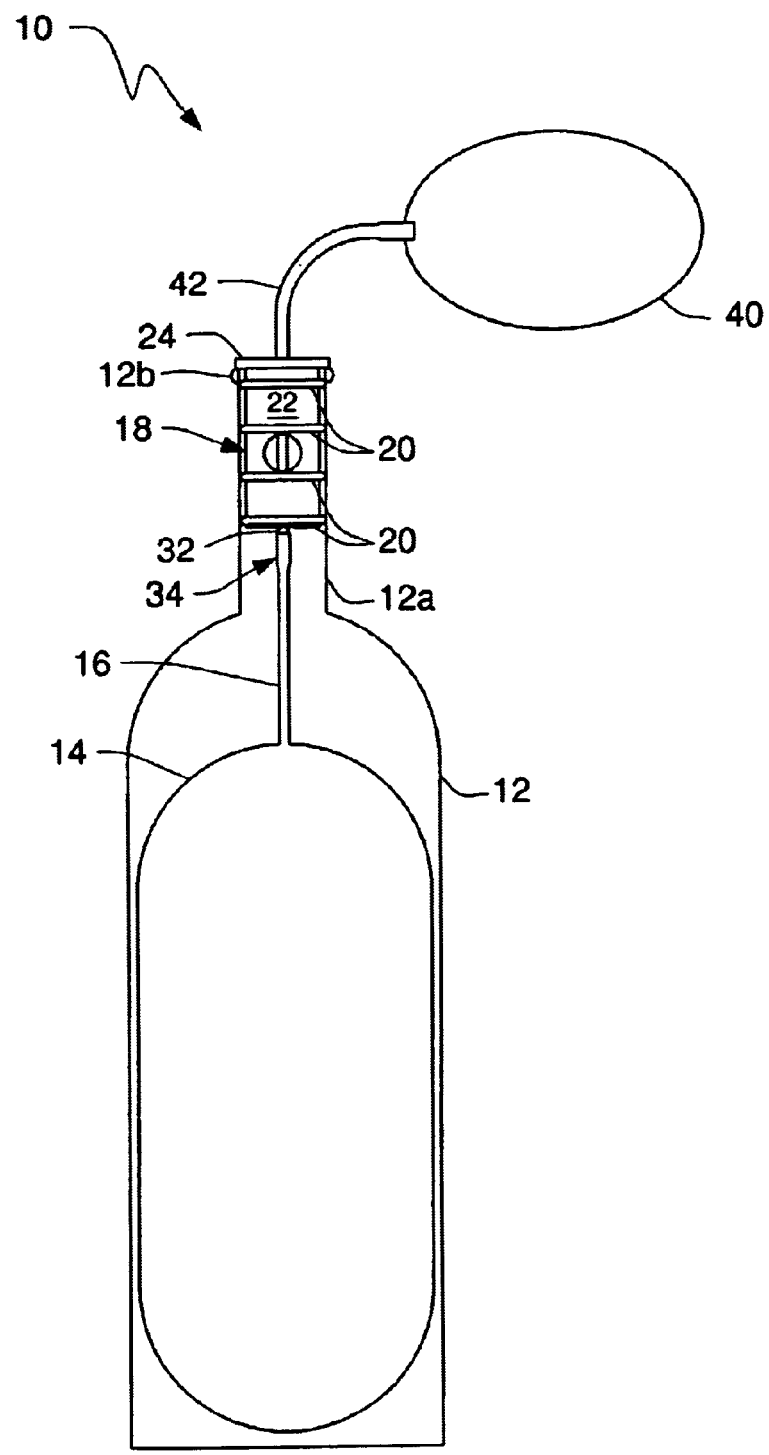
FIG. 1B is a side elevational view of the first embodiment when inserted into the neck of a wine bottle in its closed configuration.

Referring now to FIGS. 1A and 1B, it will there be seen that an illustrative embodiment of the invention when connected to a wine bottle is denoted as a whole by the reference numeral 10. The wine bottle is denoted 12; it includes neck 12a and rim 12b.

The invention has equal utility with liquids other than wine. It is described in detail in the context of wine for convenience purposes. More particularly, the invention has utility with any liquid fluid of any volatility and any chemical composition.

An inflatable bladder 14 is positioned in the interior of wine bottle 12 and is depicted in an inflated configuration in FIG. 1. Elongate neck 16 of bladder 14 has a diameter substantially less than the diameter of bladder 14 when the bladder is in its inflated configuration.

Stopper 18 is depicted in its first, extended or "pour" configuration relative to bottle 12 in FIG. 1A and in its second, retracted or "closed" position in FIG. 1B. Stopper 18 has a solid cylindrical construction and a diameter that enables it to be press fit by slidingly insertion into neck 12a of bottle 12. A plurality of vertically spaced apart O-rings, collectively denoted 20, circumscribe cylindrical main body 22 of stopper 18 and serve to seal the stopper against leakage when said cylindrical main body is positioned within neck 12a.

Upper rim 24 surmounts stopper 18 and has a diameter greater than the inner diameter of neck 12a so that said upper rim cannot be inserted into said neck. Upper rim 24 also provides a gripping surface having utility when it is desired to re-position stopper 18 from its second, retracted position (FIG. 1B) to its first, extended position (FIG. 1A) or to remove stopper 18 completely from bottle neck 12a.

Figure 2:
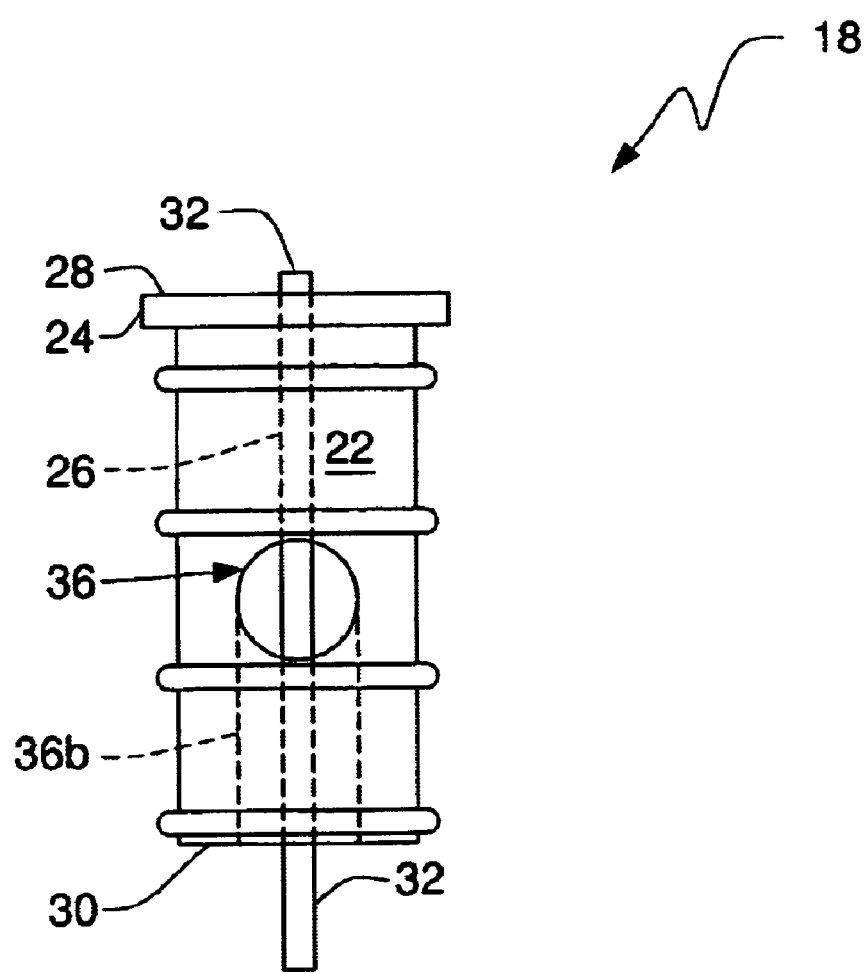
FIG. 2 is a side elevational view of the first embodiment of the stopper.
Figure 3:
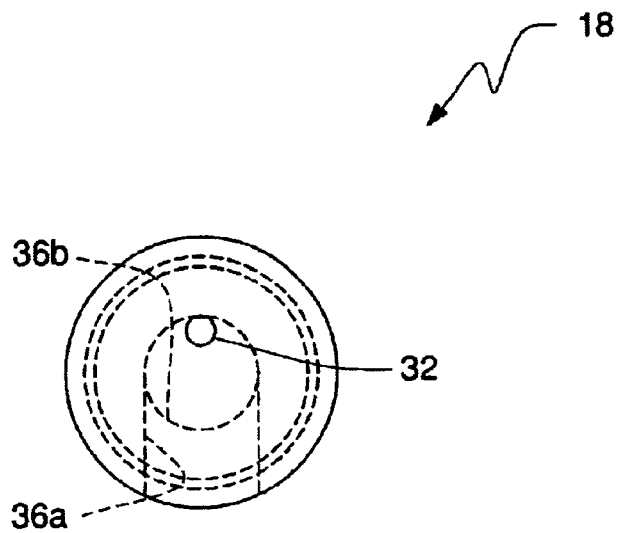
FIG. 3 is a top view of said first embodiment.
Figure 4:
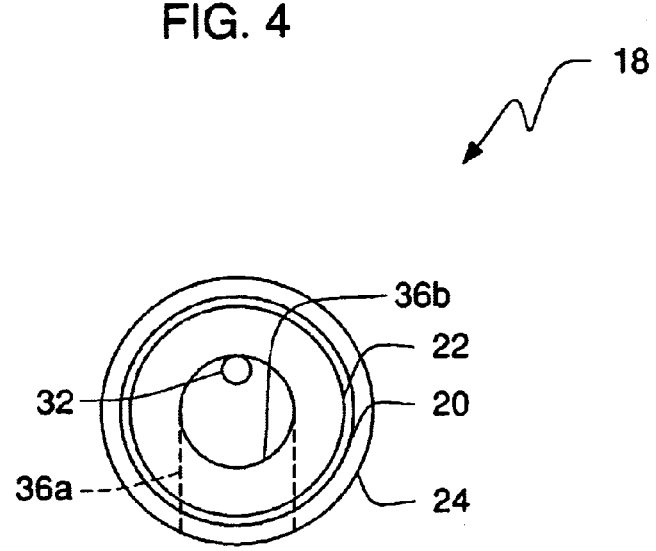
FIG. 4 is a bottom view of said first embodiment.

Stopper 18 is depicted in greater detail in FIGS. 2–4. First bore or air duct 26 is formed in stopper main body 22 and extends from top wall 28 of stopper 18 to bottom wall 30 thereof.

Mounting tube 32 is slidingly received within first bore 26 so that the upper end of mounting tube 32 extends a little above top wall 28 and so that its lower end extends a little below bottom wall 30. However, neither the top nor the bottom extension is required as will become increasingly clear as this disclosure proceeds.

Accordingly, attaching elongate neck 16 of bladder 14 to mounting tube 32 as at 34 (FIGS. 1A and 1B) provides fluid communication between the interior of bladder 14 and the ambient environment at the top end of said mounting tube.

A second bore or wine duct 36 is formed in stopper 18 and has a diameter substantially greater than the diameter of first bore 26.

More particularly, second bore 36 has a ninety degree (90°) bend formed therein. Thus, it includes a radially-extending first part 36a (FIGS. 3 and 4), hereinafter sometimes referred to as a pour vent, and a longitudinally-extending second part 36b, sometimes hereinafter referred to as a wine duct, that are in open communication with one another. The outermost end of radially-extending pour vent 36a is in open communication with a sidewall of stopper 18. The innermost end of pour vent 36a is in open communication with longitudinally-extending wine duct 36b as aforesaid. The lowermost end of wine duct 36b is in open communication with bottom wall 30 of stopper 18.

Returning now to FIGS. 1A and 1B, there it will be seen that a hand-held air pump includes squeeze bulb 40 and flexible neck 42 that is secured to the upper end of mounting tube 32 in fluid communication therewith. The pump is used after wine has been decanted. After decanting, an air space exists above the wine and it is this air that must be removed if the wine is to avoid oxidation.

With the pour vent open by placing the novel stopper in its FIG. 1A position, alternately squeezing and releasing squeeze bulb 40 pumps air into bladder 14. As bladder 14 expands, wine inside bottle 12 is displaced upwardly until it supplants all air within the wine chamber. The stopper is then placed into its FIG. 2 position, closing the pour vent. The inflating means is then removed and the wine bottle can be placed into storage with no air contacting the wine.

Figure 5:
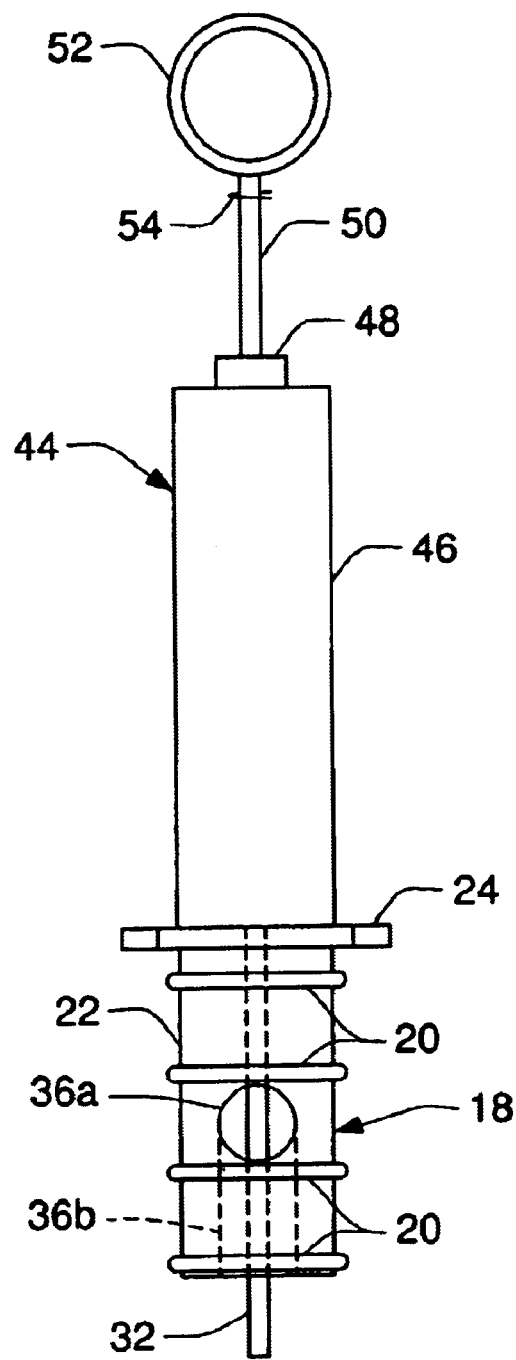
FIG. 5 is a side elevational view of a second embodiment of the novel stopper.

FIG. 5 depicts a second embodiment where squeeze bulb 40 and flexible neck 42 are eliminated in favor of a more advanced pump structure denoted 44 as a whole. Pump 44 includes a main body 46, a boss 48 that surmounts said main body, plunger 50, and handle 52 secured to the trailing end of plunger 50. An outlet nozzle, not illustrated, positioned at the leading end of main body 46, is in fluid communication with the upper end of mounting tube 32 so that operation of the inflating means causes air to flow through the mounting tube into the bladder.

Locking device 54 holds handle 52 in its fully "down" position when said locking device engages boss 48 and is turned one half revolution. When so locked, plunger 50 cannot travel upwardly and no wine can be dispensed.

A pump mechanism within pump body 46, not illustrated to simplify the drawing, pushes air into bladder 14 on the down stroke of handle 52.

Air enters the wine chamber (the hollow interior of bottle 12) if stopper 18 is completely removed from neck 12a. To prevent such removal of stopper 18, a third embodiment (FIGS. 6–8) includes a restrictor that prevents stopper 18 from being pulled out of bottle neck 12a.

Figure 6:
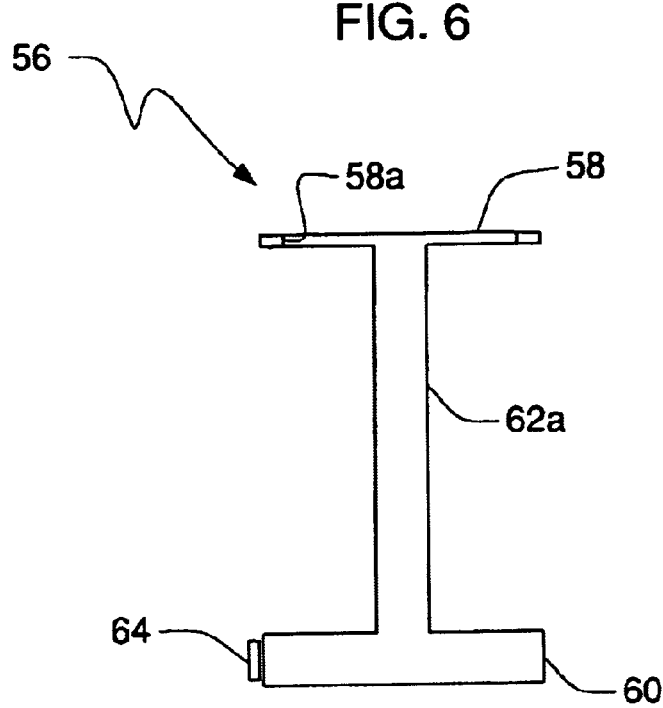
FIG. 6 is a side elevational view of a novel stopper restrictor device.
Figure 7:
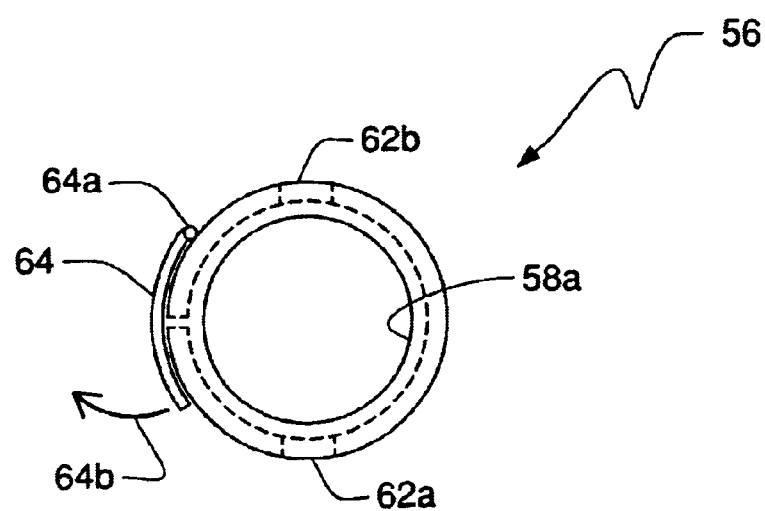
FIG. 7 is a top view of said stopper restrictor device.
Figure 8:
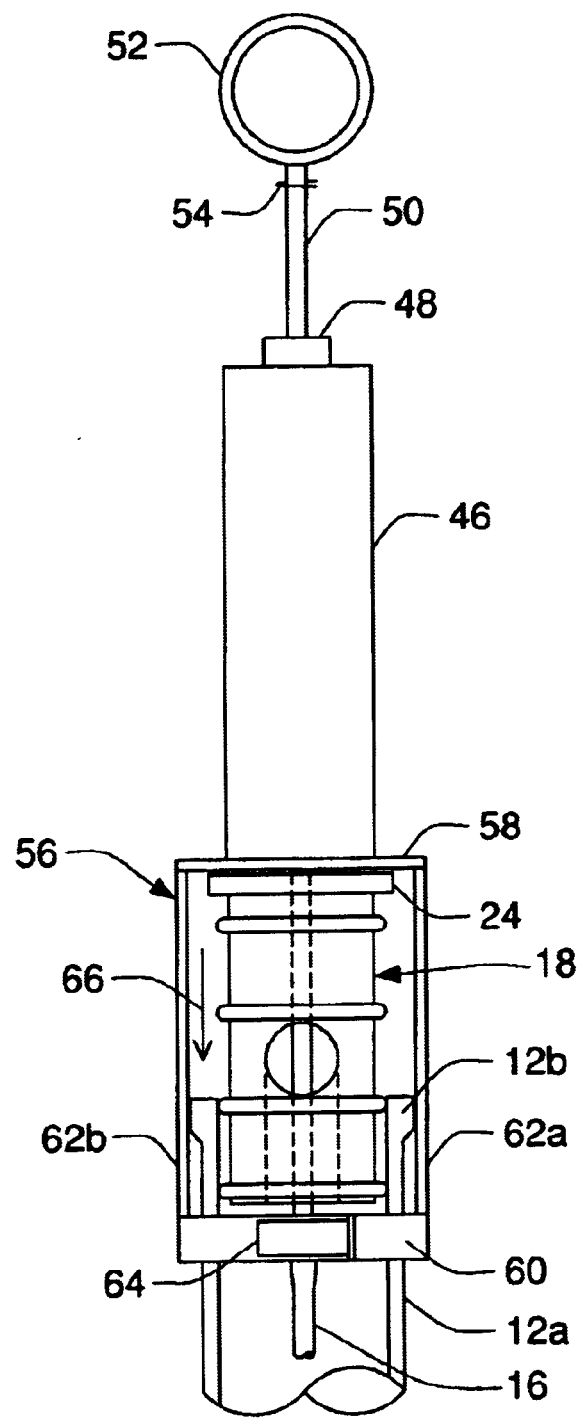
FIG. 8 is a front elevational view of the novel restrictor when installed in its operative configuration.

As best understood in connection with FIGS. 6–8, restrictor 56 includes top wall 58 having central aperture 58a (FIGS. 6 and 7) that slideably receives pump body 46, a compression fitting 60 that engages bottle neck 12a, a pair of diametrically opposed straight interconnecting rods 62a, 62b that interconnect top wall 58 and compression fitting 60, and a release handle 64 that disengages compression fitting 60 from bottle neck 12a and thereby enables removal of restrictor 56 from said bottle neck 12a. Release handle 64 includes a hinge 64a that enables release handle 64 to swing out as indicated by directional arrow 64b. When handle 64 is swung out, compression fitting 60 is enlarged so that it can be slipped over bottle rim 12b. The structure is like that of a watchband where a pair of links are pivotally attached to one another so that when opened the band can receive a hand therethrough. Other such means for enlarging the diameter of compression fitting 60 are within the scope of this invention.

Pump main body 46 is slideably received within central aperture 58a as aforesaid. Note that top wall 58 of restrictor 56 overlies rim 24 of stopper 18 and that the diameter of central opening 58a is less than the diameter of said rim 24. Accordingly, pump main body 46 is displaced downwardly when stopper 18 is displaced downwardly from its FIG. 8 position, as indicated by directional arrow 66, when stopper 18 is placed into its second, retracted, or closed configuration.

Figure 9:
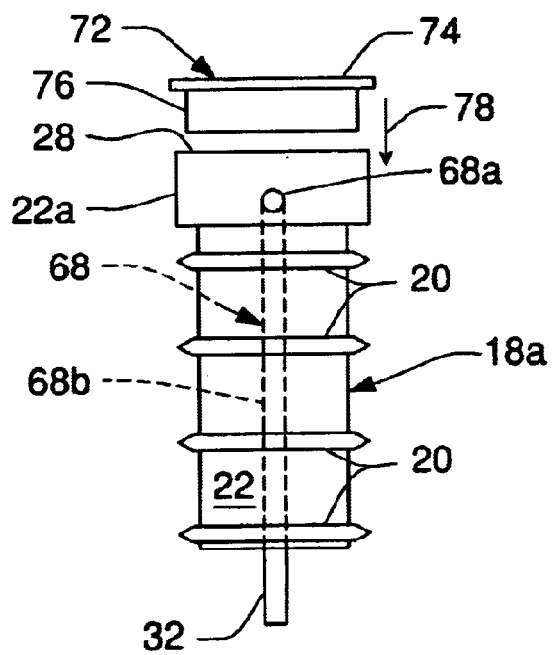
FIG. 9 is a side elevational view of a fourth embodiment that includes a cap.
Figure 10:
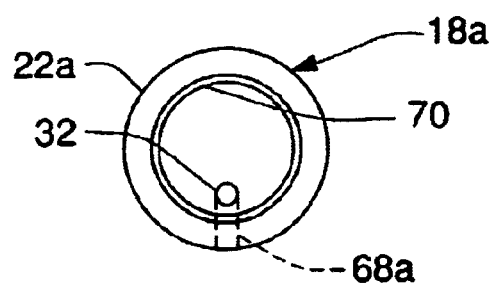
FIG. 10 is a top plan view of the structure depicted in FIG. 9.

A fourth embodiment is depicted in FIGS. 9 and 10. The radially-disposed part 68a of air duct 68 is formed in enlarged top part 22a of stopper 18a. The longitudinally-disposed part 68b thereof extends from the radially-innermost end of said radially-disposed part 68a to bottom wall 30 of said stopper. Mounting tube 32 has a longitudinally-extending section disposed in longitudinally-disposed part 68b of air duct 68 and a ninety degree (90°) bend is formed in said mounting tube so that a radially-extending part thereof extends into said radially-extending part 68a of said air duct 68.

An air pump like that of the first embodiment may be employed to pump air into bladder 14 through said air duct 68.

In the alternative, as in the other embodiments, no mounting tube is employed and the outlet nozzle of the air pump is inserted directly into radially-disposed part 68a of the air duct.

In this fourth embodiment, base 22 of stopper 18 is hollow, forming wine duct 70, as indicated in FIG. 10. Thus, wine duct 70 of this embodiment extends from the top wall of the stopper to the bottom wall thereof. Cap 72 includes top wall 74 and plug 76. Plug 76 is press fit into the upper end of wine duct 70 of stopper 18 and top wall 74 limits the insertion depth of said plug 74 because its diameter exceeds the inner diameter of said wine duct 70.

To decant wine from bottle 12, flexible neck 16 of bladder 14 is connected to the lower end of mounting tube 32, (or, as in the other embodiments, the upper end of a mounting tube attached to the bladder is inserted into the lower end of longitudinally-extending part 68b of the air duct). Air duct stopper main body 18a is inserted into bottle neck 12a, and cap 72 is removed. As the wine is poured, it flows through wine duct 70 into a wine glass. Air flows into the wine chamber (i.e., the inside of the bottle) through wine duct 70 and into bladder 14 through air duct 68.

When the pouring has been completed and it is desired to place the wine bottle into its storage mode where the wine remaining in the bottle is not contacted by air, flexible neck 42 of air pump 40 is placed into fluid communication with the radially-extending outer end of mounting tube 32 or directly into radially-extending part 68a of air duct 68 if no mounting tube is used. The pump is operated to inflate the bladder until wine reaches a level just below top wall 28 of stopper 18. The distance from top wall 28 to the wine level is slightly less than the depth or length of plug 76.

In the alternative, bladder 14 may be inflated until wine in the bottle is level with top wall 28. This results in some spillage when cap 72 is installed but ensures that no air pocket is formed between the bottom of plug 76 and said wine. Cap 72 is inserted into wine duct 70 as indicated by directional arrow 78 in FIG. 9. The inflating means is then removed from its fluid communication with the air duct.

Figure 11A:
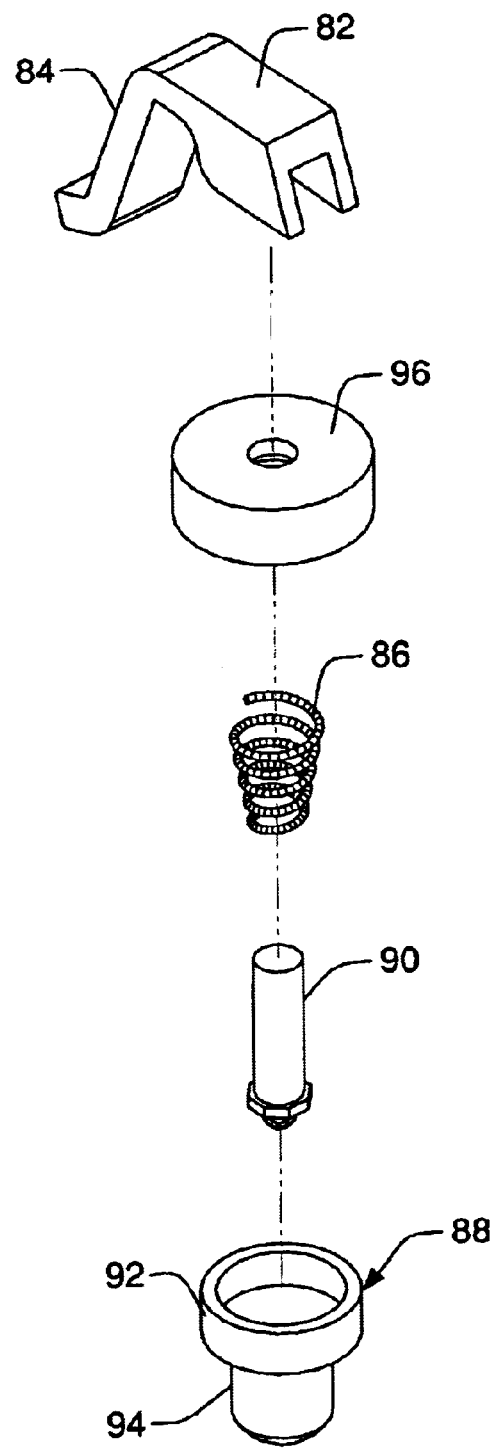
FIG. 11A is an exploded perspective view of the valve of the fifth embodiment.
Figure 11B:
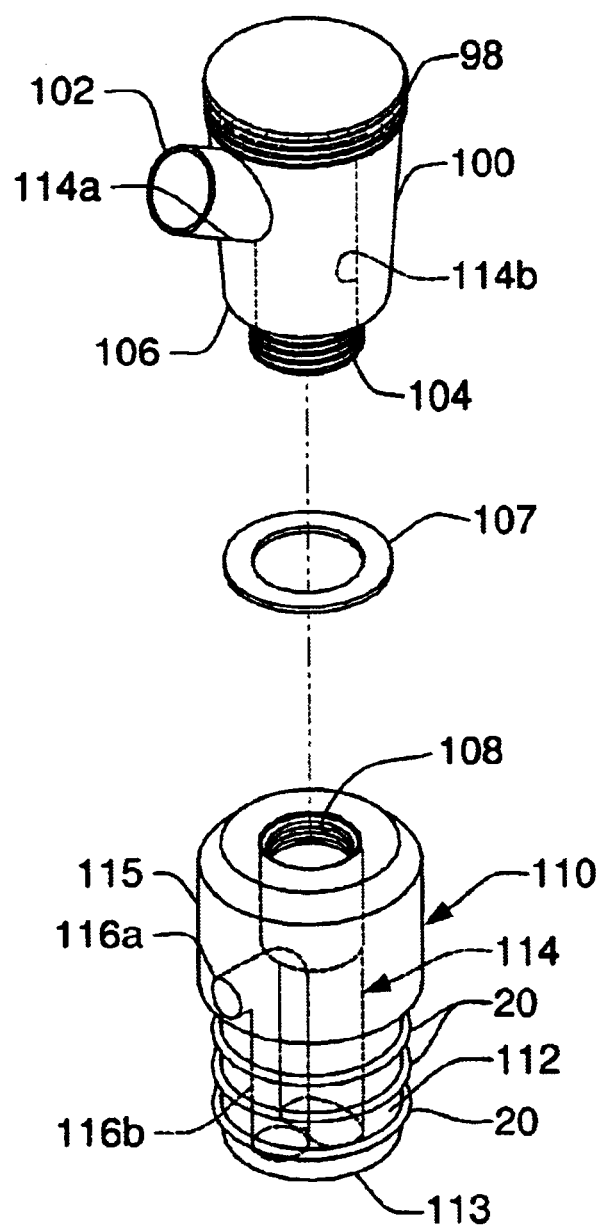
FIG. 11B is an exploded perspective view of the stopper and dispenser parts of the fifth embodiment.
Figure 11C:
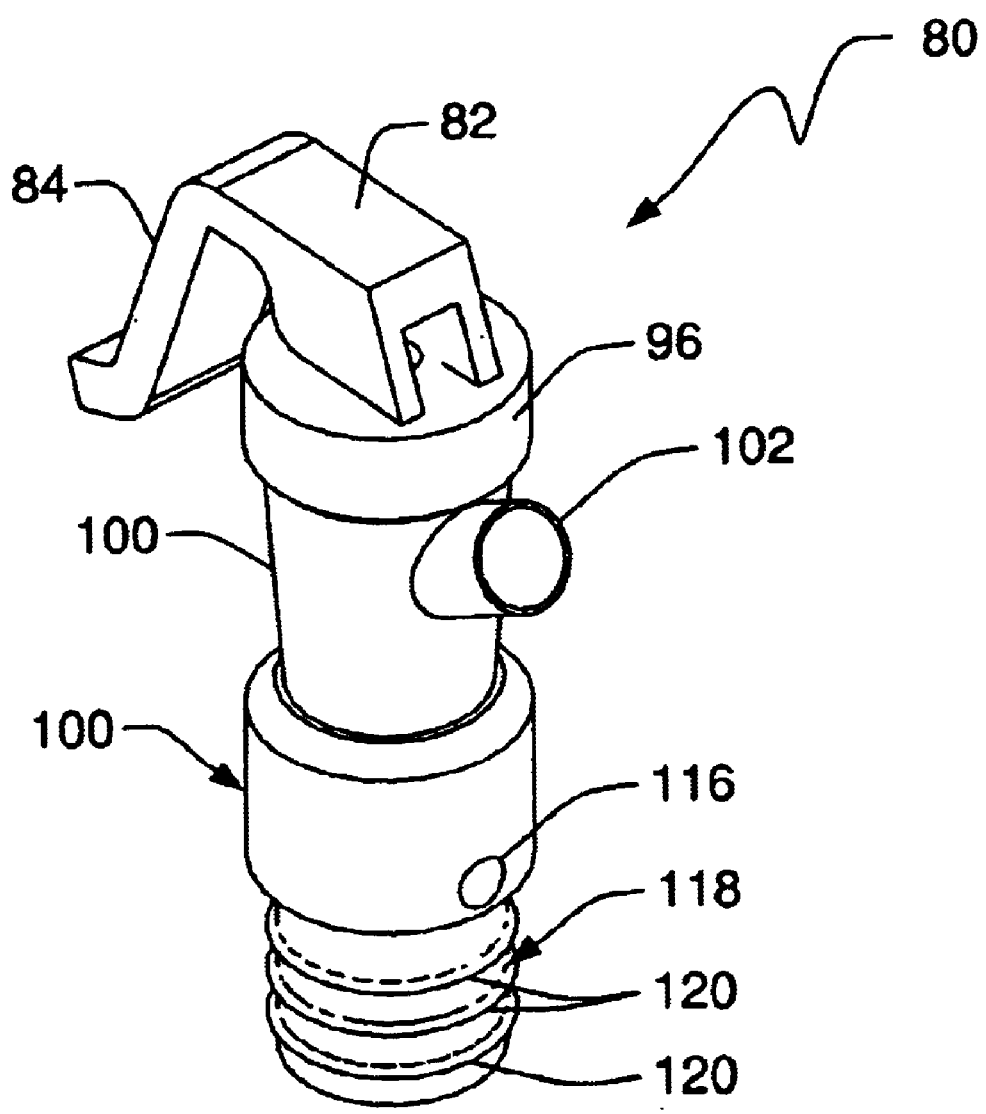
FIG. 11C is a perspective view of the fifth embodiment when in its assembled configuration.

A fifth embodiment of the novel stopper is denoted 80 as a whole in FIG. 11C and its structure is best understood by comparing FIGS. 11A–C. Valve handle 82 includes a trailing end 84 that is depressed by a user's thumb to open a normally closed valve when wine is being poured. A spring 86 (FIG. 11A) is positioned in spring housing 88 and maintains handle 82 in its position of repose unless a user depresses the handle to overcome the bias supplied by spring 86.

Post 90 is also disposed within spring housing 88 and spring 86 ensleeves the post as indicated by the assembly line in FIG. 11A.

Spring housing 88 is formed of a flexible, resilient plastic and includes large diameter part 92 and reduced diameter part 94.

Cap 96 is internally threaded and screwthreadedly engages external screws 98 (FIG. 11B) formed in the upper rim of dispenser part 100.

The valve assembly depicted in FIG. 11A is commercially available from Tomlinson Hall & Co. company of Cleveland, Ohio.

Spout 102 is in open fluid communication with the radially-extending part 114a of wine duct 114. The longitudinally-extending part of said wine duct is denoted 114b.

External threads are formed in reduced diameter part 104 that depends from centrally apertured bottom wall 106 of dispenser 100 and said threads 104 engage internal threads 108 formed in stopper 110. O-ring 107 seals that connection.

Stopper main body 110 includes main body 115 and base 112 having a reduced diameter relative to said main body. The external diameter of stopper base 112, including the diameter of resilient and compressible O-rings 20, is slightly greater than the internal diameter of wine bottle neck 12a. The diameter of main body 115 is greater than the diameter of the bottle neck. Thus, bottom wall 117 (FIG. 11F) of said main body abuts rim 12b of bottle 12 when this fifth embodiment is in use.

Wine conduit 114 extends from the top wall to the bottom wall of stopper main body 110. As best understood in connection with FIG. 11B, said wine conduit 114 also extends into dispenser part 100 where its longitudinally-extending part is denoted 114b and its radially-extending part is denoted 114a.

Radially-extending part 116a of air duct 116 is formed in main body 115 and longitudinally-extending part 116b thereof extends from the radially inner end of said radially-extending part 116a to bottom wall 113 of base 112.

Figure 11D:
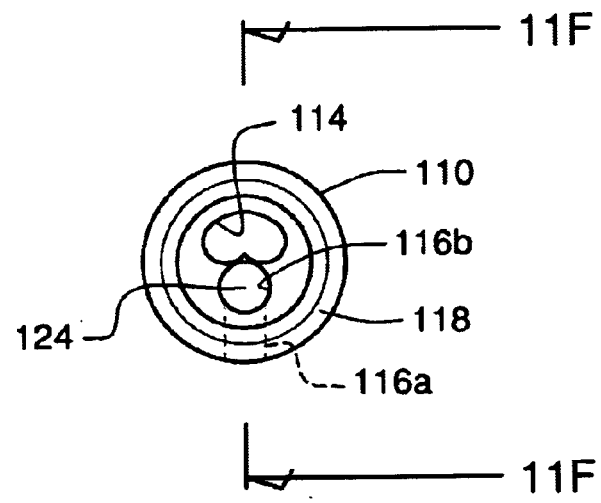
FIG. 11D is a top plan view of the stopper of the fifth embodiment.
Figure 11E:
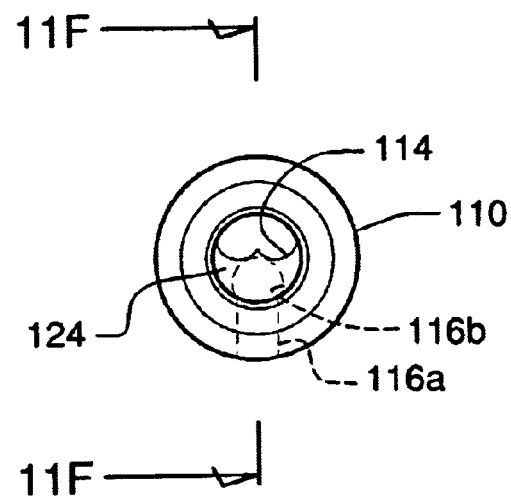
FIG. 11E is a bottom plan view of the stopper of the fifth embodiment.

Air duct 116 is not in fluid communication with wine conduit 114 because partition 124 (FIGS. 11D–F) formed in base 110 separates wine conduit 114 from said air duct.

Figure 11F:
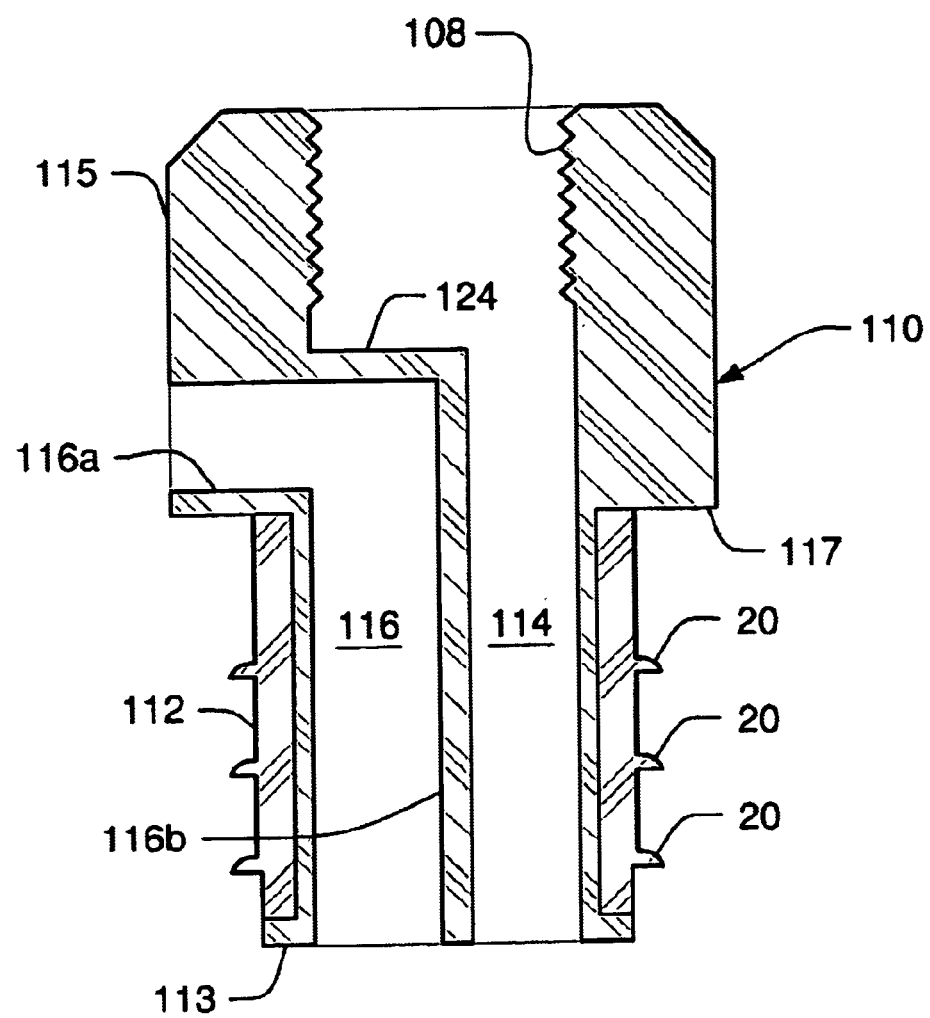
FIG. 11F is a longitudinal sectional view taken along line 11F—11F in FIG. 11D and along line 11F—11F in FIG. 11E.
Figure 11G:
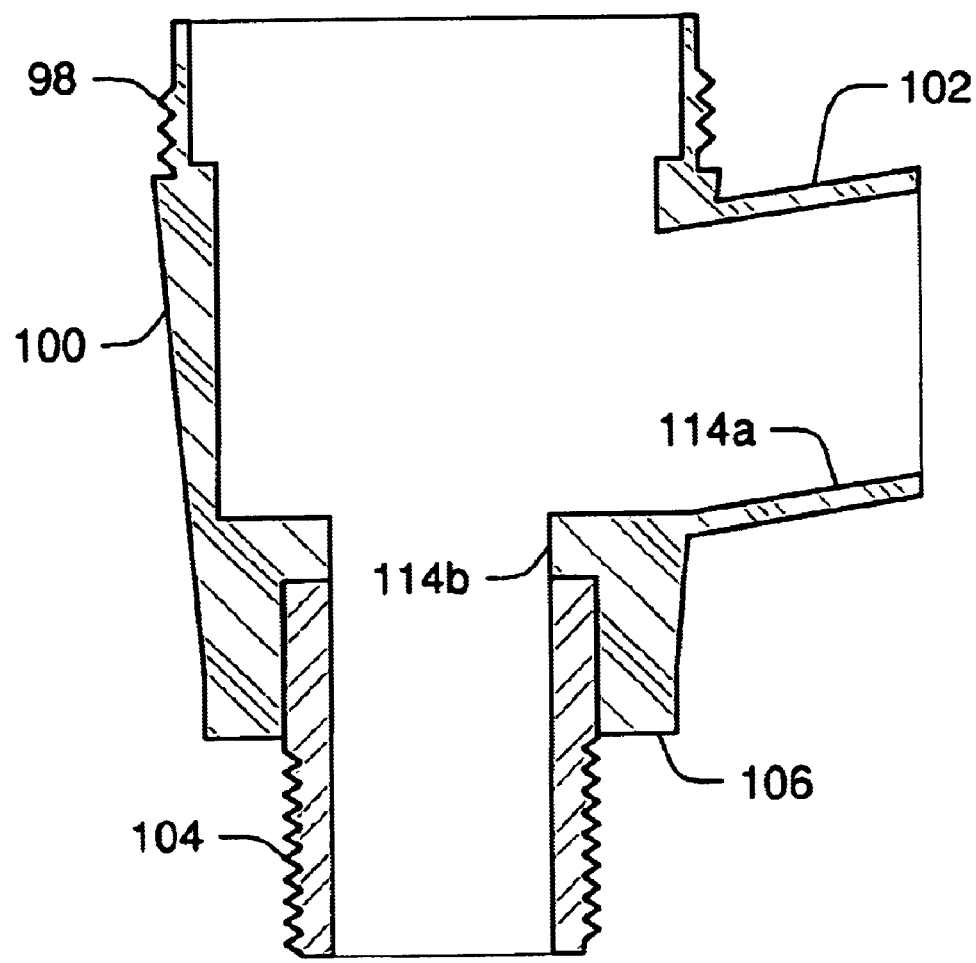
FIG. 11G is a longitudinal sectional view of the dispenser of FIG. 11B.

A resilient plastic seal 118 having a plurality of parallel ribs, collectively denoted 120, overlies base 112 in the embodiment of FIG. 1C. Seal 118 and ribs 120 prevent leakage of wine when stopper 80 is in use. Although O-rings 20 are depicted in FIGS. 11B and 11F, it should be understood that plastic seal 118 having ribs 120 which overlies and covers base 112, or O-rings 20 which are secured to said base 112, are interchangeable with one another and both are depicted in the illustrations of the fifth embodiment for that reason. Other suitable sealing means are also within the scope of this invention.

To use this fifth embodiment, base 112 of stopper 110 is inserted into the neck of a wine bottle until bottom wall 113 of base 112 abuts the rim of said bottle neck. Handle 84 is pressed to allow wine to flow through wine duct 114 and through spout 102 into a wine glass (see FIG. 12E). More particularly, the bottle is tilted about thirty degrees (30°) over horizontal (or one hundred twenty degrees (120°) from a vertical position, and handle 84 is not pressed until the bottle is in that ready-to-pour position. Accordingly, when handle 84 is pressed, the valve supplied by Tomlinson Hall & Co. as aforesaid is opened and wine flows out of the bottle into a glass with no air flowing into the wine chamber. Air flows into the bladder from the ambient environment through air duct 116, thereby expanding the bladder as wine is poured from the wine chamber.

When the pouring is completed, air is pumped into the bladder by attaching the outlet nozzle of a suitable inflating means to radially-extending part 116a of air duct 116 and operating said inflating means until the wine within the wine chamber rises to the top of the bottle, thereby supplanting air therefrom. Handle 84 is held down during the inflation of bladder 14 so that the wine duct valve is open. When all air is out of the bottle, releasing handle 84 returns the valve to its normally closed configuration, thereby maintaining the air-less condition of the wine chamber. As in the other embodiments, the inflating means is then disengaged from its fluid communication with the air duct and the bottle is placed into storage.

In all embodiments, a vacuum is created in the wine chamber as wine flows out the pour spout. The vacuum draws air in through the air duct and fills the bladder to displace the dispensed wine. After completion of a decanting procedure, with the bottle in an upright configuration, air is forced into the air duct by a suitable inflating means, forcing the bladder to expand inside the bottle thus causing the surface level of the wine in the bottle to rise until all air is supplanted from the wine chamber. Closing the wine duct than locks the vacuum so that the inflating means may be removed from the air duct without affecting the level of wine in said wine chamber.

FIGS. 12A–F depict how bladder 14 is packaged and disclose how said bladder is inserted into the hollow interior of bottle 12 without being touched by the hand of the installer.

Figure 12A:
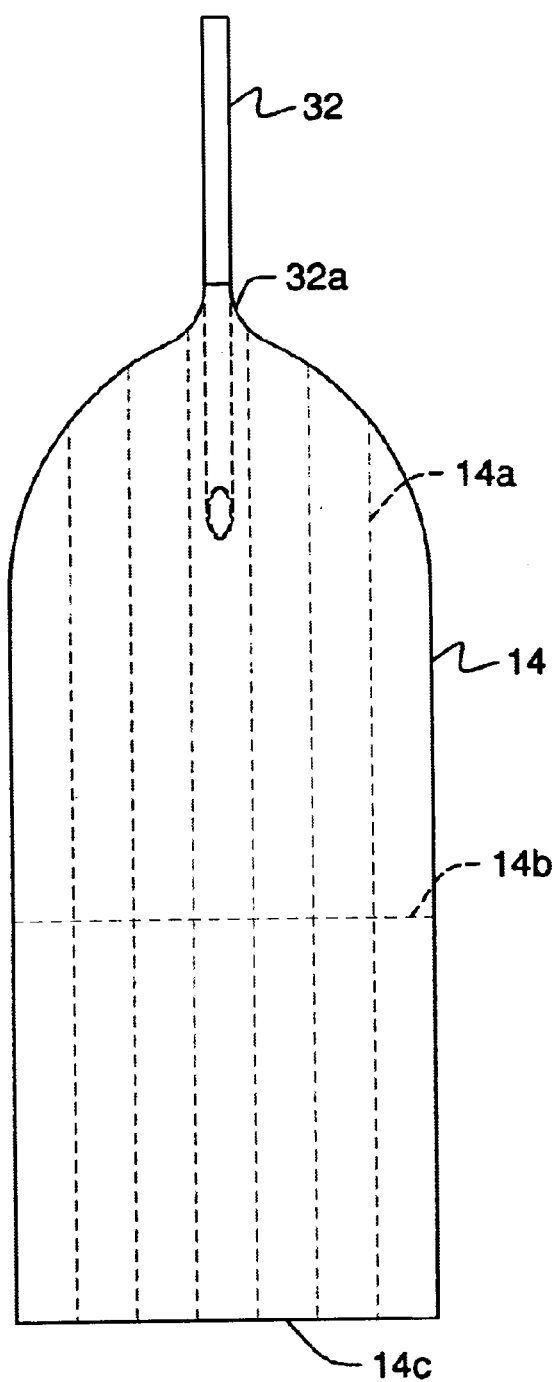
FIG. 12A is a front elevational view of the bladder in its unfolded configuration.
Figure 12B:
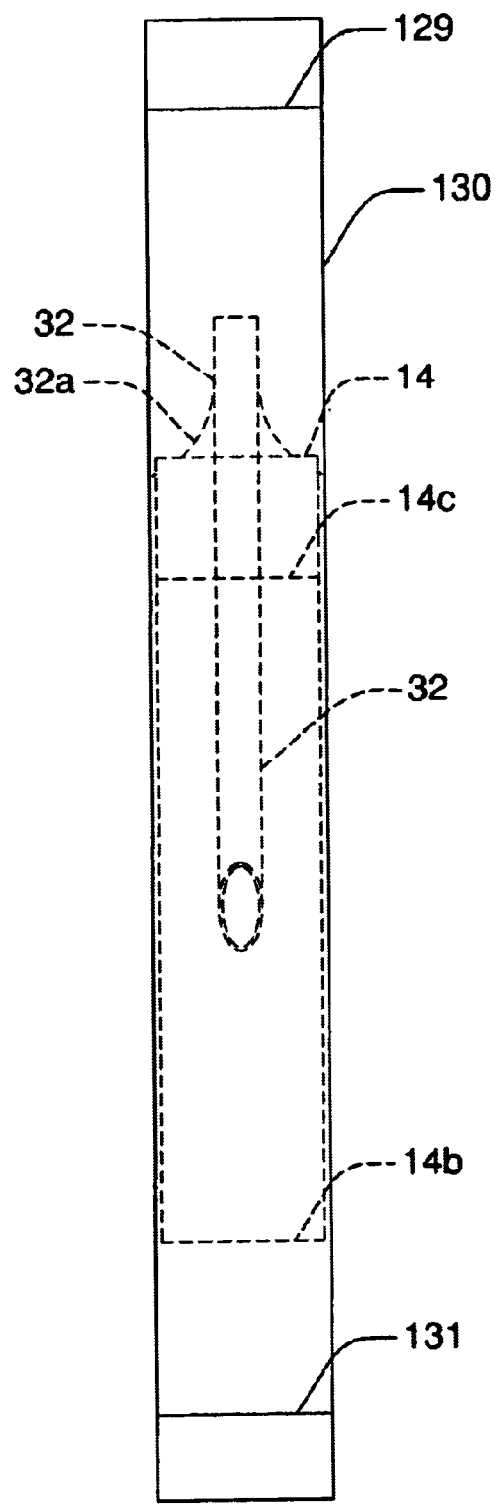
FIG. 12B depicts the novel wrapper when in its unopened configuration.

Bladder 14 is accordion or fan-folded as indicated in FIG. 12A by the straight dotted lines denoted 14a so that it is narrow enough, when folded along said lines, to fit within wrapper 130 (FIG. 12B). Bladder 14 is also folded along transverse folding line 14b. More particularly, bladder 14 is accordion or fan-folded along straight dotted lines 14a first, and then folded transversely about folding line 14b.

When fan-folded and transversely folded as aforesaid, bottom 14c of bladder 14 is spaced only slightly downwardly from the top of said bladder as depicted in FIG. 12B.

FIG. 12B depicts wrapper 130 when in its unopened configuration. Lines 129 and 131 are sealing lines where wrapper 130 is sealed. Since top removal is required, upper seal line 129 is perforated.

Figure 12C:
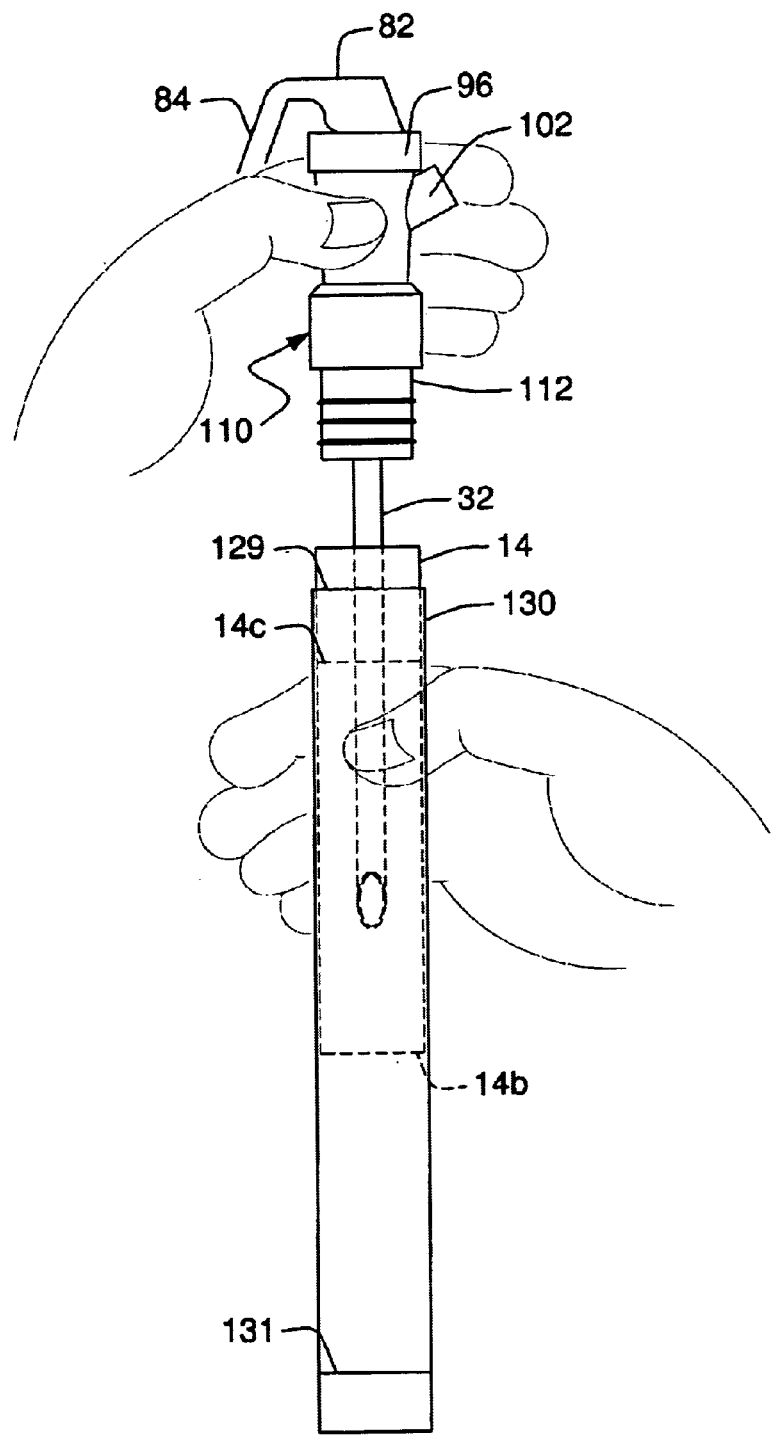
FIG. 12C depicts how the mounting tube attached to the bladder is inserted into the lower end of the air duct of the fifth embodiment of the novel stopper without the user's hands touching the bladder.

FIG. 12C depicts wrapper 130 when opened at the top along perforation line 129. Such opening enables insertion of the upper end of mounting tube 32 into the bottom of air duct 116 without the user's hands touching bladder 14.

FIG. 12D depicts how stopper assembly 80 is inverted and how bladder 14 unfolds about transverse folding line 133 into a "V"-shape under its inherent bias, enhanced by the fan fold, as said bladder is gradually withdrawn from wrapper 130 at the opening formed by perforation line 129.

As depicted in FIG. 12D, this enables bottom 14c of bladder 14 to be fed into the wine chamber as said bladder is withdrawn from wrapper 130.

Figure 12E:
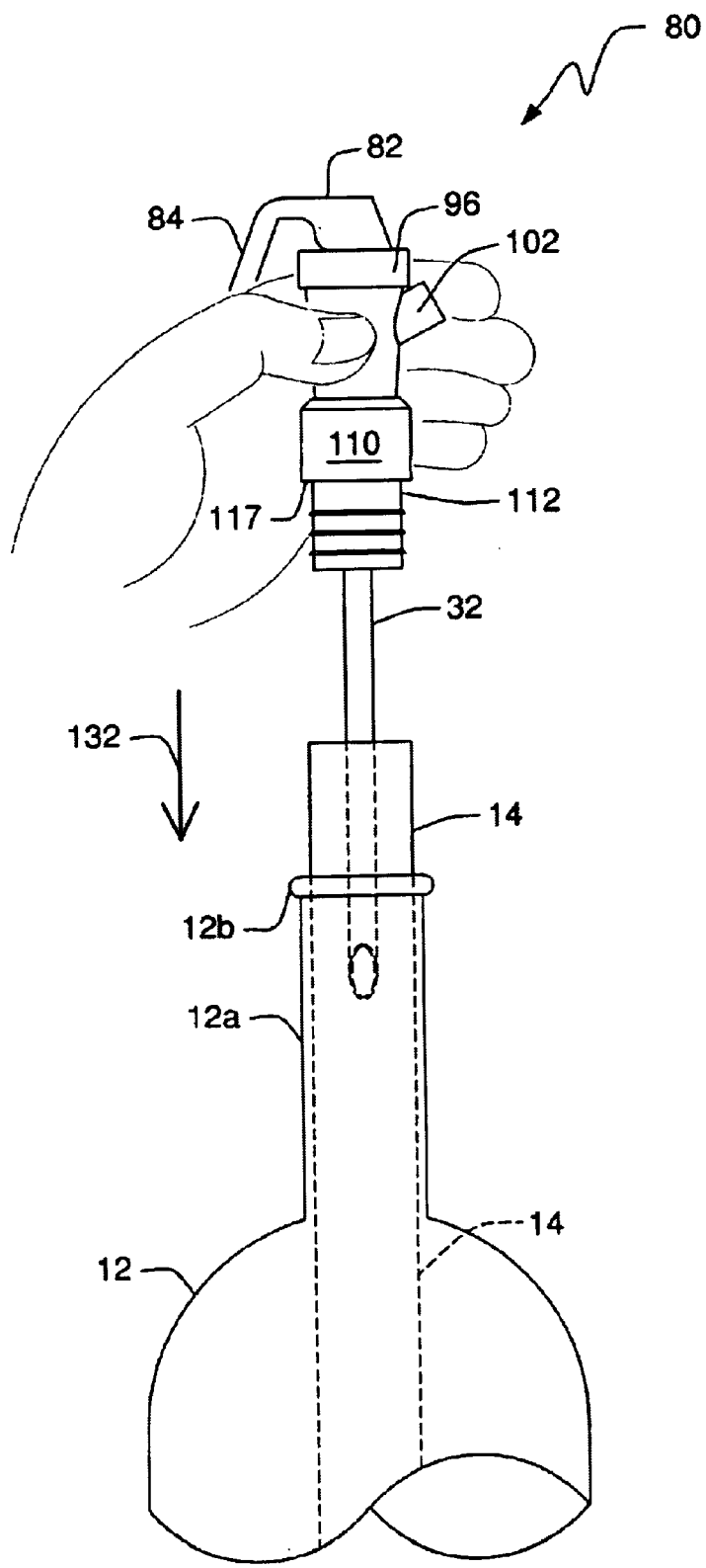
FIG. 12E depicts the novel bladder, in its unfolded configuration, when being inserted into a wine bottle.

After bladder 14 is fully removed from wrapper 130, stopper assembly 80 is brought to its FIG. 12E position and bladder 14 is lowered into the wine chamber as indicated by directional arrow 132 until stopper assembly 80 is fully seated atop rim 12b of neck 12a of bottle 12, i.e., until annular step 117, formed where stopper main body 110 meets base 112, abuts said rim 12b.

Figure 12F:
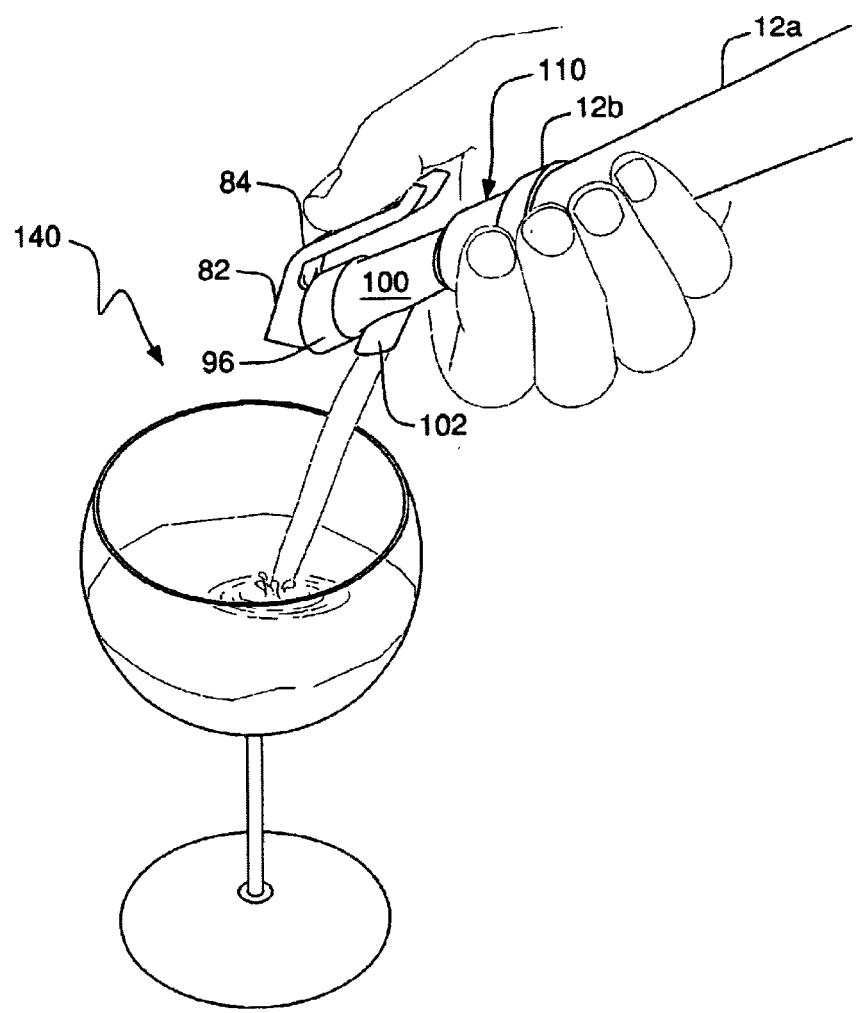
FIG. 12F perspective view depicting a user holding down the novel handle when pouring wine into a wine glass.

FIG. 12F is a perspective view depicting a user holding down the novel handle when pouring wine into wine glass 140. As mentioned earlier, ambient air flows through air duct 116 into bladder 14 during such pouring, advantageously inflating said bladder as said wine is poured. When the pouring is completed, the user releases handle 84, thereby closing the valve in the wine duct and stopping further wine flow. The wine bottle is placed upright on a level support surface and the user again depresses handle 84 while pumping air into bladder 14 using any suitable inflating means such as a squeeze pump until the wine level rises to the top of the wine chamber, supplanting all air therefrom. The air escapes through the valve opened by depressing handle 84. Accordingly, releasing said handle when the wine level has risen to the desired height prevents air from flowing back into the wine chamber. Air duct 116 remains open but the vacuum created by closing the wine duct valve prevents air from flowing in either direction through the air duct.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A device for dispensing a liquid fluid from a container and for protecting unpoured liquid fluid from excessive oxidation by reducing ullage, comprising:

a hollow interior of said container defining a liquid fluid chamber;

a stopper removably mounted in a neck of said container;

said stopper having a first, extended position relative to said neck of said container that enables pouring of liquid fluid from said container, said stopper having a second, retracted position relative to said neck of said container that prevents liquid fluid from being poured from said container;

a first bore formed in said stopper, said first bore having a first diameter and extending longitudinally from a top wall of said stopper to a bottom wall of said stopper;

a second bore formed in said stopper, said second bore having a second diameter greater than said first diameter;

said second bore having a radially-extending first part and a longitudinally-extending second part;

said radially-extending first part having a radially outermost end in open communication with a sidewall of said stopper;

said longitudinally-extending second part having a lower end in open communication with said bottom wall of said stopper;

said radially outermost end being in open communication with ambient when said stopper is in said first, extended position;

said radially outermost end being closed by said neck of said container when said stopper is in said second, retracted position;

an inflatable bladder in fluid communication with said first bore;

inflating means for inflating said bladder;

said inflating means being connected to said top end of said first bore;

said inflatable bladder adapted to displace liquid fluid remaining in said container when said bladder is inflated;

whereby when said stopper is in said extended position, liquid fluid in said container is poured from said container through said second bore;

whereby when said stopper is in said extended position, said inflating means is operated to inflate said bladder so that liquid fluid in said liquid fluid chamber is displaced by said bladder until said liquid fluid displaces substantially all air from said liquid fluid chamber so that no oxygen is in contact with said liquid fluid;

whereby said stopper in placed into said retracted position after inflation of said bladder; and whereby said inflating means is then disconnected from said first bore without affecting the level of liquid fluid in said liquid fluid chamber.

2. The device of claim 1, further comprising:

said means for inflating said bladder including a hand-held air pump that includes a neck having a free end that is removably placed into fluid communication with said first bore so that alternately squeezing and releasing said hand-held air pump causes air to flow through said neck, through said first bore, and into said bladder.

3. The device of claim 1, further comprising:

said means for inflating said bladder including a pump having a cylindrical main body, a plunger mounted for reciprocation with said main body, a handle secured to a trailing end of said plunger and an outlet nozzle in fluid communication with said top end of said first bore so that operation of said pump causes air to flow through said first bore into said bladder.

4. The device of claim 3, further comprising:

a restrictor for preventing separation of said stopper from said neck of said container;

said restrictor including a top wall having a ventral aperture formed therein that slideably receives said cylindrical pump body of said pump;

a compression fitting that engages said container neck;

a plurality of straight interconnecting rods that are circumferentially spaced from one another and that interconnect said top wall and said compression fitting; and a release handle that disengages said compression fitting from said container neck to enable removal of said restrictor from said container neck;

said stopper having a rim at an upper end thereof;

said top wall disposed in overlying relation to said rim;

said diameter of said central opening being less than a diameter of said rim so that when said restrictor is displaced downwardly, said stopper is displaced downwardly into its second, retracted, or closed configuration.

5. A device for dispensing liquid fluid from a container and for protecting unpoured liquid fluid from excessive oxidation by reducing ullage, comprising:

a stopper removably mounted in a neck of said container;

said stopper having a top part and a base that depends from said top part, said base having a reduced diameter relative to a diameter of said top part;

a first bore formed in said stopper, said first bore having a first diameter and extending longitudinally from a top wall of said stopper to a bottom wall of said stopper;

a cap removably mounted to said stopper, said cap being removed from said stopper when liquid fluid is being poured from said container and said cap closing said first bore when no liquid fluid is being poured from said container;

a second bore formed in said stopper, said second bore having a first, radially-extruding part and a second, longitudinally-extending part;

said second bore having a second diameter less than said first diameter;

said second bore extending radially relative to a longitudinal axis of said stopper;

said second bore having a radially outer end in open communication with a sidewall of said stopper;

an inflatable bladder connected in fluid communication to said first bore, said inflatable bladder having an exterior surface that contacts liquid fluid inside said container;

said bladder being inflated by pumping air into said first bore after liquid fluid has been decanted from said container;

said bladder being inflated until liquid fluid remaining in said container rises through said first bore to a level spaced from said top wall of said stopper by a depth of said cap;

whereby installing said cap closes said first bore and prevents air from contacting said liquid fluid remaining in said container.

6. A device for dispensing liquid fluid from a container and for protecting unpoured liquid fluid from excessive oxidation by reducing ullage, comprising:

a stopper removably mounted in a neck of said container;

said stopper having a top part having a first diameter greater than an internal diameter of a neck of said container;

said stopper heaving a base having a second diameter that is reduced with respect to said top part;

said second diameter being slightly less than said internal diameter of said neck of said container so that said base is snugly received within said neck;

sealing means disposed in circumscribing relation to said base to prevent liquid fluid in said container from flowing around said base;

an internally threaded bore formed in said top part;

a dispenser having a top part having a first diameter and a second part having a second diameter that is reduced with respect to said first diameter;

said bottom part of said dispenser being externally threaded to screw-threadedly engage said internally threaded bore formed in said top part of said stopper;

a liquid fluid duct formed in said stopper, said liquid fluid duct extending longitudinally from a top wall of said stopper to a bottom wall of said stopper, said liquid fluid duct being co-extensive with said internally threaded bore formed in said top part of said stopper;

a pour spout extending radially outwardly from said dispenser in open fluid communication with said liquid fluid duct;

an air duct formed in said stopper, said air duct having a ninety degree bend formed therein and having a radially-extending part and a longitudinally-extending part that are in open fluid communication with one another but not in fluid communication with said liquid fluid duct;

said radially-extending part of said air duct being formed in said top part of said stopper and said longitudinally-extending part of said air duct extending from a radially-innermost end of said radially-extending part to said bottom wall of said stopper;

said radially outward end of said air duct being in open communication with an ambient environment;

an inflatable bladder having an exterior surface that contacts liquid fluid inside said container;

said inflatable bladder being connected to a bottom end of said longitudinally extending part of said air duct;

inflating means adapted to be removably connected in fluid communication with said radially-extending part of said air duct so that operation of said inflating means inflates said bladder;

said bladders when inflated, displacing liquid fluid remaining in said container so that the liquid fluid level within said container rises to displace air from said liquid fluid chamber;

said air being vented from said liquid fluid chamber through said liquid fluid duct;

whereby said liquid fluid is protected from oxidation when substantially all air in said liquid fluid chamber is displaced therefrom.

7. A method for inserting an inflatable bladder into a container without touching the inflatable bladder, comprising the steps of:

providing said stopper with a main body and a neck having a reduced diameter relative to said main body;

forming an air duct and a liquid fluid duct in said main body and in said neck;

sealing a mouth of said bladder to a mounting tube so that a first end of the mounting tube protrudes from the bladder and a second end of the mounting tube extends into the hollow interior of the bladder;

folding said bladder along a plurality of longitudinal folding lines that are parallel to one another and equidistantly spaced apart from one another to create an accordion fold so that a width of said bladder when accordion-folded is only slightly greater than a width of said mounting tube;

folding said bladder along a transverse folding line so that a bottom of said bladder is spaced slightly downwardly from a top of said bladder;

removing said longitudinally and transversely raided bladder from a wrapper by withdrawing the wrapper until said first end of the mounting tube protrudes from the wrapper;

positioning said stopper in an upright configuration and inserting said first end of said mounting tube into said air duct while holding said wrapper;

inverting said wrapper and said stopper;

further withdrawing said wrapper until said bottom end of said bladder protrudes from said wrapper inserting said bottom end of said bladder into a neck of a container while holding said wrapper;

further withdrawing said wrapper until said bladder is fully removed therefrom;

returning said stopper to said upright position and further inserting said bladder into said container until said bladder is fully received within said container;

inserting said neck of said stopper into sealing relation to said neck of said container;

whereby said stopper and bladder are fully inserted into said container without touching said bladder.

* * * * *